(No Model.)  5 Sheets—Sheet 1.
T. WRIGHT.
STREET SWEEPER.
No. 371,722. Patented Oct. 18, 1887.
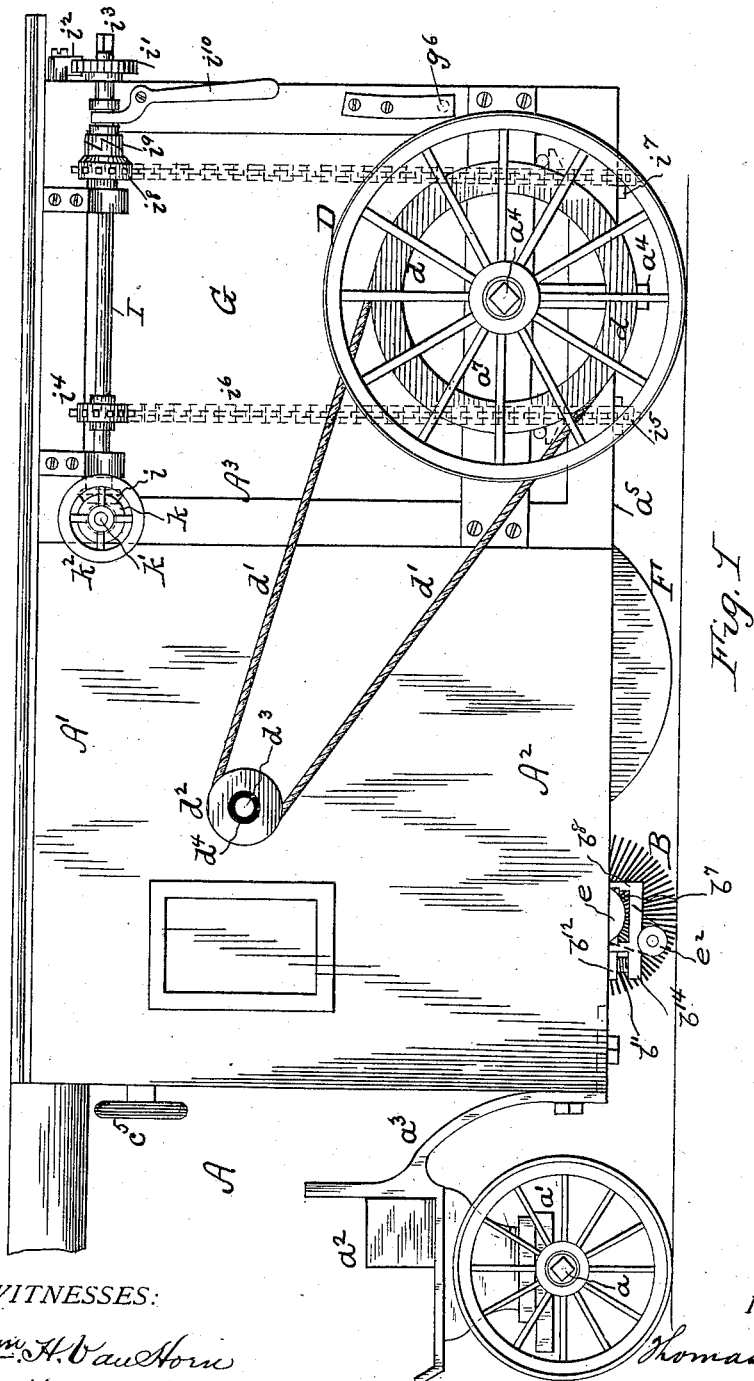
WITNESSES:
INVENTOR,
Thomas Wright
By S. J. Van Stavoren
ATTORNEY (No Model.) 5 Sheets—Sheet 2.
T. WRIGHT.
STREET SWEEPER.
No. 371,722. Patented Oct. 18, 1887.
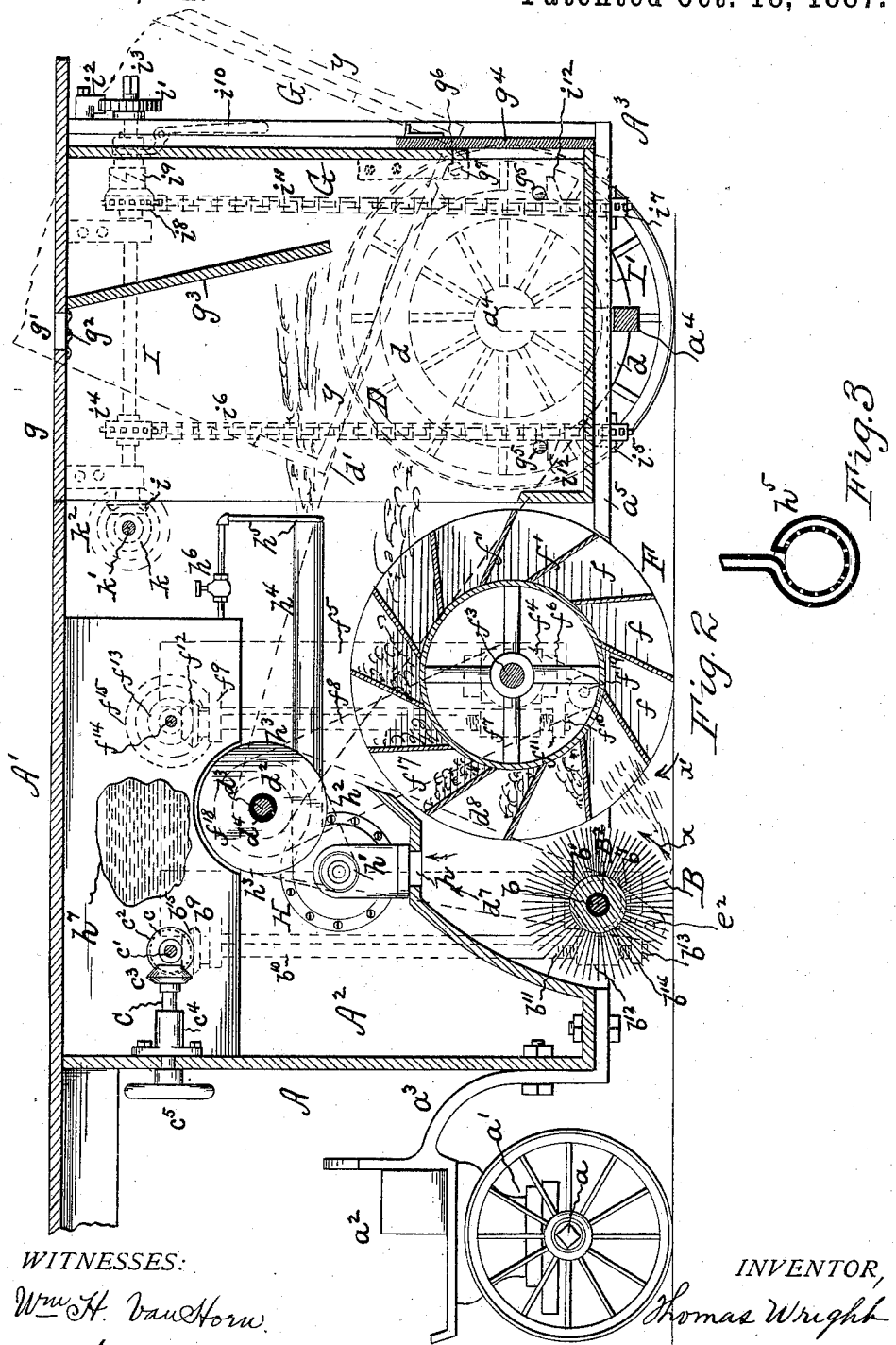
WITNESSES:
Wm H. VanHorn
M H Walker
INVENTOR,
Thomas Wright
By S.J. VanStavoren
ATTORNEY

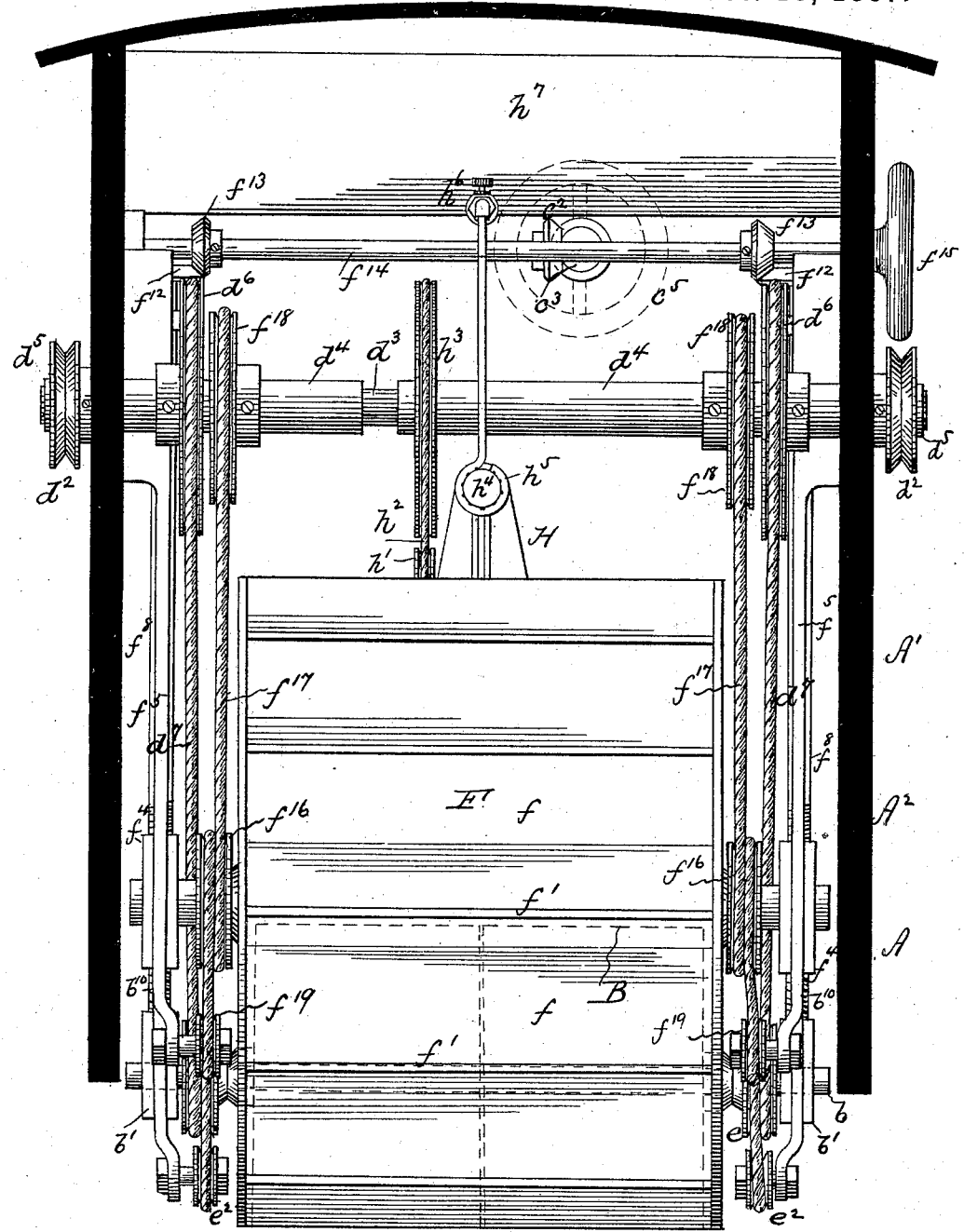

(No Model.) 5 Sheets—Sheet 4.

T. WRIGHT.
STREET SWEEPER.

No. 371,722. Patented Oct. 18, 1887.

WITNESSES:

INVENTOR,
Thomas Wright
By S. J. Van Stavoren
ATTORNEY (No Model.) 5 Sheets—Sheet 5.

T. WRIGHT.
STREET SWEEPER.

No. 371,722. Patented Oct. 18, 1887.

WITNESSES:

INVENTOR,
Thomas Wright
By S. J. Van Stavoren
ATTORNEY

UNITED STATES PATENT OF

THOMAS WRIGHT, OF CAMDEN, NEW JERSEY, ASSIGNOR OF
TO DONALD McCALLUM, OF SAME PLACE.

STREET-SWEEPER.

SPECIFICATION forming part of Letters Patent No. 371,722, dated Octo

Application filed January 27, 1886. Serial No. 189,893. (No model.)

*To all whom it may concern:*

Be it known that I, THOMAS WRIGHT, a citizen of the United States, residing at Camden, in the county of Camden and State of New Jersey, have invented certain new and useful Improvements in Street-Sweepers, of which the following is a specification, reference being had therein to the accompanying drawings, wherein—

Figure 5:
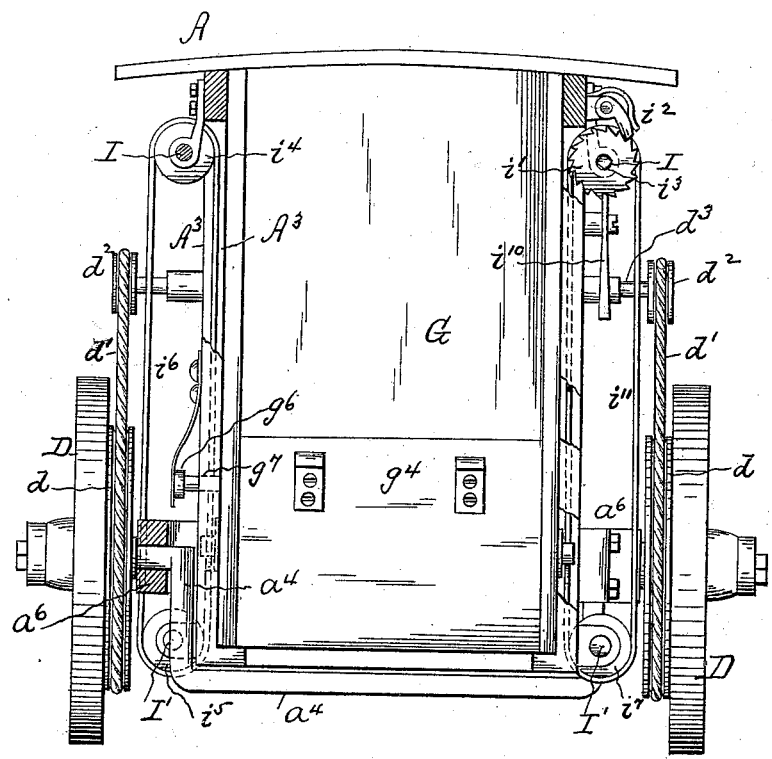
Figure 6:
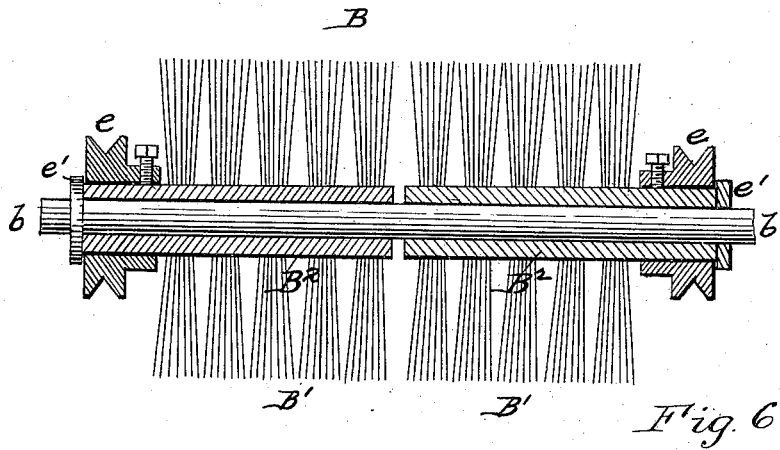
Figure 7:
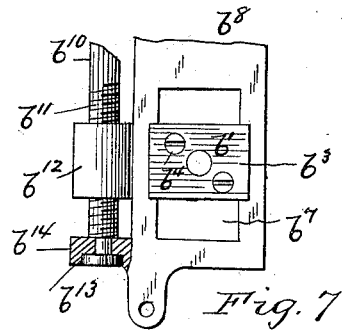
Figure 8:
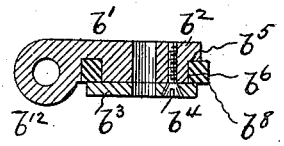
Figure 9:
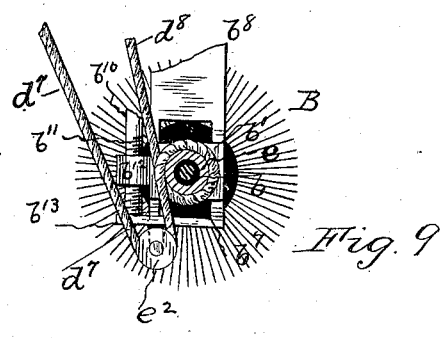

Figure 1 is a side elevation of a sweeping device or vehicle embodying my improvements. Fig. 2 is a central longitudinal section of same. Fig. 3 is a detail section showing perforated end of water-pipe for the end of blower or fan pipe. Fig. 4 is a transverse section, partly in elevation, of the vehicle, drawn to an enlarged scale. Fig. 5 is a rear end elevation, partly sectional, of the sweeping device or vehicle. Fig. 6 is a longitudinal section of sweeping brush and shaft. Fig. 7 is an elevation, partly sectional, drawn to an enlarged scale, of one of the adjustable bearings for the sweeping-brush and for the revolving cylinder or dirt receptacle or carrier and a part of the frame or support for said bearing. Fig. 8 is a horizontal section of same; and Fig. 9 is a sectional elevation showing said bearing, supporting-frame, and brush with one of its driving-pulleys, and the manner of passing a driving chain or belt around the same to permit the brush, its shaft, and bearings to be raised or lowered without slacking or tightening the driving belts or chains.

My invention has relation to street-sweeping machines or vehicles; and it consists of the novel combination, construction, and arrangement of parts, as hereinafter described and claimed.

In the drawings, A represents, preferably, a four-wheeled vehicle or sweeping device, composed of a body, A', the front axle, a, of which is suitably arranged upon a fifth-wheel or other turning device, a', located preferably in advance of the front of the vehicle, as shown, and provided with a seat, $a^2$, for the driver, which seat or its frame is connected to the vehicle by suitable braces, $a^3$. The rear axle, $a^4$, is bent around the bottom $a^5$ of the body A', as more plainly shown in Fig. 5, and has its supports in the sides of the body A', as plainly indicated at $a^6$ in said figure.

The body A' may be of an the forward part, $A^2$, of wh inclosed, and the rear part, made skeleton form, as is m in Fig. 1, and in the longit this skeleton frame the rear ports $a^6$.

Near or at the forward p is located a transverse sweep shaft b of which is journal bearings b', composed, prefera $b^2$ and $b^3$, screwed or other gether, as shown at $b^4$, (see form side grooves, $b^5$, adap edges, $b^6$, of elongated slots ends of frames or supports ened to the inner sides of th plainly shown in Fig. 4. T at their upper ends project: form upper bearings for r with screw-threads $b^{11}$ near for engaging with threaded $b^{12}$, formed on the plates $b^2$ c and the lower ends of the 1 able step-bearings, $b^{13}$, in l from the lower ends of fran The upper ends of both o: provided with bevel-wheels with like wheels, c, upon which connects or gears bo together, so that they can 1 rotated by turning shaft c' center of shaft c' is anothe which meshes with a like w1 C, mounted in a bearing or the front of the vehicle, anc a hand-wheel, $c^5$, so that by the shafts C c' and rods $b^{10}$ are to cause the screw portions either raise or lower the bea of frames $b^8$, and thereby el brush B to and from the str regulate the extent or depth to take up the wear of the l The hand-wheel $c^5$ is plac vehicle, so as to be within driver or other attendant The brush B is preferably tions, B' B', (see Fig. 6,) each to it a tubular sleeve, $B^2$, hav end a driving pulley or wh tions B' B' are loosely mounted upon shaft $b$, and held in place by end collars, $e'$, fixed to said shaft $b$. This construction of brush permits one section to sweep independently of the other, so that when the vehicle is turning a corner or making a short turn at the ends of its to-and-fro travel along the street or roadway the brush-section on the outside part of the curve, or that which has to move through the greatest extent of the curve described in turning, revolves and sweeps independently of the other section, which moves through the shortest or inside curve described in turning, and as both brush-sections, when the vehicle turns around, revolve independently of each other, and, owing to the slipping of one or the other of the same, at different rates of speed, they sweep the roadway clean when the vehicle is moving in a curved line as well as when in a straight line.

Attached to the wheels D upon rear axles, $a^4$, and preferably upon the inner sides of said wheels, are grooved or other driving-wheels $d$, having a belt or chain connection, $d'$, with like but smaller pulleys, $d^2$, secured to counter-shafts $d^4$. The latter, as indicated more plainly in Figs. 2 and 4, are composed of tubular sleeves loosely mounted upon a fixed rod, $d^3$, and loose sleeves $d^4$, held in place by suitable collars, $d^5$. Upon the outer ends of these sleeves or shafts $d^4$ are secured the said pulleys $d^2$, which are, as shown, outside of the vehicle-body. Within the latter, and secured to sleeves $d^4$, are grooved or other pulleys $d^6$, which have a belt or chain connection, $d^7$, with the pulleys $e$ upon the ends of the sleeves $B^2$ of brush-shaft $b$, whereby power is transmitted from wheels $d$ to shaft-sleeves $d^4$ for rotating brush B.

The function of the loose sleeves or shafts $d^4$ upon fixed rod $d^3$ is to admit of the same revolving independently of one another to correspondingly drive the sections B' B' of the brush, or to permit the driving-belt $d^7$ for one of the brush-sections to readily slip while the belt for the other section is acting to rotate the same in going around curves, as above described.

As the brush and its shaft-bearings $b'$ are vertically adjustable, the chains or belts $d^7$ must be in gear with pulleys $e$ in such manner that the belts or chains $d^7$ will not slack or sag when the brush is raised and will not become taut when the brush is lowered. To provide for this described result I secure idler-wheels or groove-pulleys $e^2$ to the lower ends of frames $b^8$; or said pulleys $e^2$ may be otherwise suitably located on said frames, so as to be in line with the shaft pulleys or wheels $e$, and coil or pass one side, $d^8$, of the belts or chains $d^7$ completely or once around the pulleys $e$, and then pass the same under or over the idler pulleys or wheels $e^2$, as plainly shown in Figs. 4 and 9. As the brush B and its shaft $b$ are either raised or lowered the wheels or pulleys $e$ revolve within the coil of chain or belting $d^7$ around them, to ride or move up and down the side $d^8$ of said chains or belts producing any slack or tightenin To the rear of brush B, and pr close proximity to the brush as to get without touching it, is pl transverse drum or cylinder, F, periphery or face a series of buc ning lengthwise of the cylinder, partitions or sides $f'$, set more or tial or inclined to the face of t This cylinder, with its outside br a revolving receptacle for the s brush B, and is equal or nearly length of the latter, and rotates ir opposite to that given to brush B, by the arrows $x$ $x'$, Fig. 2, so brush sweeps up the dirt it is b thrown into the buckets $f$ of th cylinder F and carried around the it falls out of the buckets into a b tacle, G, at the back of rotary re The latter is secured to a shaft, $f^3$, which are journaled in bearings $f^4$, or sliding in frames $f^5$, in the ma described for brush-shaft bearing said rotary receptacle is adapted t or lowered—that is to say, the l are composed of two plates suital together, having side grooves adap gated slots $f^6$ in the lower ends of one of the plates of each bearin; threaded lug, $f^7$, which engages wi rod, $f^8$, of which there is one for ing, and each of which rods passes lug, $f^9$, on the upper end of its frame $f^5$, upon which it is mounte a step-bearing, $f^{10}$, in a lug, $f^{11}$, at t of the frames, and also at its up bevel-wheel, $f^{12}$, which engages w wheel, $f^{13}$, on a counter-shaft, $f^{14}$, h; able bearings in the sides of the vel hand-wheel, $f^{15}$, by means of which tacle F is raised or lowered, as desi Upon shaft $f^3$ of receptacle F ar grooved or other suitable wheels or p which are connected by chains or l like pulleys or wheels, $f^{18}$, upon the $d^4$ of shaft $d^3$, and one side of eac chains or belts $f^{17}$ is coiled once a pulley $f^{16}$, with which it connects, a passed under or over idler-pulleys $f$ to frames $f^5$, as above described for belts $d^7$ and pulleys $e^2$; but the coil in t case is in an opposite direction to tl latter case, whereby the receptacle tated in a direction the reverse of tha B, as above described, and is susce being either raised or lowered witho ening or tightening its driving belts $f^{17}$ $f^{17}$. Consequently both the rotary r F and the brush B are adapted to be i ently elevated from and depressed to surface of the street without necessit: justment of their power-transmitting The driving chains or belts $f^{17}$ for receptacle F are preferably connectec leys $f^{18}$ on sleeves $d^4$ on rod $d^3$, to pe or the other of said belts to easily slip when the vehicle is turning a curve, whereby the rotary movement of receptacle from end to end accommodates itself to the varying distance or extent of travel as the receptacle makes the turn. This is essential when the receptacle F is more or less in contact with the roadway; but when raised above the latter the sectional or driving shafts $d^4$ for the receptacle may be dispensed with.

To avoid the annoyance arising from the fine dust escaping from the vehicle during sweeping, I secure an exhaust fan or blower, H, about an opening, $h$, in the floor of the vehicle, below which the brush B is located, and connect its driving-pulley $h'$ by a belt or chain, $h^2$, with a pulley, $h^3$, on one of the sleeves $d^4$ on rod $d^3$, for the purpose of creating a suction above the brush to direct the dust arising from the sweeping into the blower, and thence out of its outlet-pipe $h^4$ into box or receptacle G. At the end of pipe $h^4$ is located a rose or circular perforated pipe, $h^5$, having a cock, $h^6$, and leading to a water-tank, $h^7$, suitably located within the vehicle, either as shown or otherwise, as desired, (see Fig. 2,) the object of which is to spray water into the end of pipe $h^4$ as the dust is blown therethrough, so as to more or less wet it and condense or convert it into dirt before it is blown into receptacle G. In the roof $g$ of the latter is a vent, $g'$, for escape of air, and this vent is provided with a screen, $g^2$, to prevent the escape of fine particles of dust with the air.

Depending from the roof $g$ of box or receptacle G is a transverse board, $g^3$, which is located at or near the middle of and inclined slightly toward the rear of receptacle G, for the purpose of directing the dirt from pipe $h^4$ downwardly and depositing it at or near the middle of said receptacle. The latter has a rear slide or door, $g^4$, which is raised from time to time to remove the accumulations of dirt, which removal may be effected in any suitable manner; but I prefer to so arrange receptacle G that it can be raised and then tilted so that a cart or other vehicle may be backed under it and its slide $g^4$ raised to allow the dirt to empty itself into the cart. To accomplish this I hang upon the upper and lower bars of the skeleton part $A^3$ of body A, and on each side of the same, upper and lower shafts, I and I', respectively, the former of which have a bevel-wheel, $i$, at their forward ends, which mesh with like wheels, $k$, upon a cross-shaft, $k'$, having turning wheels $k^2$ to gear both of the upper shafts, I, together, so that a movement of counter-shaft $k'$ revolves both upper shafts, I. At the rear ends of the latter is mounted a ratchet-wheel, $i'$, having a spring or other acting pawl, $i^2$, for preventing said shafts I rotating backwardly or in but one direction, and, if desired, their extreme rear ends, $i^3$, may be made angular, as indicated, for the reception of a crank or turning-handle.

Near the forward ends of shafts I, and upon them, are secured, preferably, sprocket or drive-chain wheels $i^4$, which : wheels, $i^5$, upon the lower shai wheel $i^4$ $i^5$ are connected by a Near the rear ends of lower sh: fixed sprocket-wheels, $i^7$, wh like wheels, $i^8$, upon the upp( these last-named wheels $i^8$ are l I, and have friction or other ( vided with levers $i^{10}$ for movin into and out of engagement wi a purpose hereinafter describe The wheels $i^7$ $i^8$ are conne chains $i^{11}$. All the drive-cl have a projecting finger or which is in line with and ad$\epsilon$ with a stud, $g^5$, projecting fro receptacle G near its bottom, shown in Figs. 1 and 5. Wh is down upon the floor of the $\vee$ cated in Fig. 2, it is then in : tion, and the fingers $i^{12}$ of cha: immediately below the recepta( raise receptacle G the clutche gaged with wheels $i^8$, so that with their shafts I. The co1 then revolved by hand or othe1 thereto, which in turn rotates sl $i^4$ $i^8$, and driving-chains $i^6$ $i^{11}$, fingers $i^{12}$ to engage with the st the box or receptacle G. Wh( to a desired height, or to that a tom passes a spring-bolt. $g^6$, in in the skeleton frame $A^3$ or in vertical bars, said bolt spring neath said receptacle-bottom $\epsilon$ crum for the receptacle when done in the following manner $i^9$ $i^9$ are disengaged from whee quently a further rotation of does not rotate said wheels $i^8$ not then act to lift the rear pa receptacle G; but the wheels $i^4$ shafts I I, continue to move the front end of the box or rec it upon spring-bolt or fulcrum by dotted lines $y$, Fig. 2.

Any desired tilt or inclinatic to receptacle G, as the forwa the latter are in advance of th they prevent the receptacle slidi when it is tilted. To lower the above-described operatior versed. In raising and lowe1 tacle G the sides of the skeleto: body A form side guides for sa

What I claim is—

1. A street-sweeping vehicle ing a rotary sweeping-brush, : der fixed upon a central shaft : ripheral buckets, a box or rec ceiving the sweepings from the cylinder, double chain-conn( said dirt-receiving box and s mounted on geared shafts havi: the vehicle, and clutch mecha sponding sprocket-wheels on ; vertically raising and lowerin;

for tilting it after it is raised, substantially as set forth.

2. A street-sweeping device having a sweeping-brush composed of two independent sections, each having a driving-pulley, a tubular driving-shaft for each said section, mounted upon a fixed rod, and belt or gear connection between the brush-pulleys and tubular driving-shafts and between the latter and the driving or power wheels of the vehicle, as set forth.

3. In a street sweeping device, the box or receptacle G, having studs $g^5$, in combination with shafts I I', having sprocket-wheels and connecting-chains provided with fingers $i^{12}$, substantially as set forth.

4. In a street-sweeping machine, the box or receptacle G, having studs $g^5$, in combination with shafts I I' in gear with a counter-shaft having a hand or power wheel, sprocket-wheels on shafts I I', clutch mechanism for one of the wheels on shafts I, and drive-chains for connecting said wheels and having fingers $i^{12}$, substantially as set forth.

5. In a street-sweeping machine having the vertically adjustable and tilting receptacle or box G, the spring or self-acting catch $g^6$, as and for the purpose set forth.

6. In a street-sweeping device, the combination of a rotating brush, a rotating cylinder having peripheral buckets, an exhaust or fan, a water-spray for the outlet-pipe of the exhaust or fan, and a vertically lifting and tilting box or receptacle, G, subst: forth.

7. In combination with a vel sweeping-brush, means for raisi ing it, a rotary cylinder having face, means for raising and lowe or receptacle back of said cylind for raising and tilting said rece forth.

8. The combination of sectio having bearings $b'$, provided w lugs $b^{12}$, frames $b^8$, having slots $b$ rods $b^{10}$, having step-bearings $b^{13}$ i threaded portions $b^{11}$, engaging upper bearing in lugs $b^9$, and bev and counter-shaft $c'$, having bevel $c^2$, the former engaging with said the latter with a bevel-wheel, $c^3$ having a hand-wheel, as set fortl 9. A street-sweeping machine or posed of a partly-inclosed and pa body, a rotary brush, and a rotat with peripheral buckets in said i of the body, a lifting and tilting said skeleton part of the body, a wheels and connection between th brush and cylinder, substantially In testimony whereof I affix my presence of two witnesses.

THOMAS V

Witnesses:
S. J. VAN STAVOREN,
CHAS. F. VAN HORN.